United States Patent [19]
Heflinger et al.

[11] Patent Number: 5,467,214
[45] Date of Patent: Nov. 14, 1995

[54] BIREFRINGENCE-COMPENSATED ALIGNMENT-INSENSITIVE FREQUENCY DOUBLER

[75] Inventors: Lee O. Heflinger, Torrance; William W. Simmons, Rancho Palos Verdes; Randall J. St. Pierre, Santa Monica; Hagop Injeyan, Glendale, all of Calif.

[73] Assignee: TRW Inc., Redondo Beach, Calif.

[21] Appl. No.: 152,647

[22] Filed: Nov. 12, 1993

[51] Int. Cl.$^6$ .................................. H01S 3/10; G01J 1/20
[52] U.S. Cl. .......................... 359/238; 359/326; 359/338
[58] Field of Search .................................. 359/238, 240, 359/321, 326, 328, 338

[56] References Cited

U.S. PATENT DOCUMENTS

| | | |
|---|---|---|
| 3,441,838 | 4/1969 | Salvi . |
| 4,148,031 | 4/1979 | Fletcher et al. . |
| 4,360,925 | 11/1982 | Brosnan et al. . |
| 4,617,666 | 10/1986 | Liu ........................................... 372/22 |
| 4,618,957 | 10/1986 | Liu ........................................... 372/22 |
| 4,734,911 | 3/1988 | Bruesselbach . |
| 4,752,931 | 6/1988 | Dutcher et al. . |
| 4,778,261 | 10/1988 | Boyd et al. . |
| 4,812,639 | 3/1989 | Byren et al. . |
| 4,853,528 | 8/1989 | Byren et al. . |
| 4,955,725 | 9/1990 | Johnson et al. . |
| 4,960,319 | 10/1990 | Dankowych . |
| 5,001,718 | 3/1991 | Burrows et al. . |
| 5,052,815 | 10/1991 | Nightingale et al. . |
| 5,127,019 | 6/1992 | Epstein et al. . |
| 5,162,940 | 11/1992 | Brandelik . |
| 5,195,104 | 3/1993 | Geiger et al. . |
| 5,197,074 | 3/1993 | Emmons, Jr. et al. . |
| 5,247,389 | 9/1993 | Beausoleil . |
| 5,253,102 | 10/1993 | Okazaki .................................. 359/328 |

FOREIGN PATENT DOCUMENTS 3095982  4/1991  Japan .

OTHER PUBLICATIONS

Chase, Lloyd L. and Pinto, Albert A., OSA Proceedings on Advanced Solid-State Lasers, IEEE/Lasers and Electro-Optics Society, vol. 13, pp. 366–368, Feb. 17, 1992.
Wu, Ruikun, High-efficiency and compact blue source: intracavity frequency tripling by using LBO and BBo without the influence of birefrigence, Applied Optics, vol. 32, No. 6, pp. 971–976, Feb. 20, 1993.
Weston A. Anderson, "Analysis of High Resolution NMR Spectra," Pergamon Press, 1960.

*Primary Examiner*—Mark Hellner

[57] ABSTRACT

Apparatus and a related method for generating a second harmonic frequency optical output from a fundamental frequency input beam, without significant birefringence. The apparatus includes two Type II doubler crystals of equal length arranged with their corresponding axes parallel to each other, and a polarization rotator positioned between the doubler crystals, to rotate the polarization angle of a residual fundamental frequency component of an output beam from one of the crystals by 90° or an odd multiple of 90°. Random birefringence introduced into one of the doubler crystals is virtually canceled in the other, and the assembly of the two crystals and the polarization rotator may be angularly adjusted as needed for phase matching or tuning, without detracting from the birefringence compensation capability. The invention is also disclosed in the context of a phase conjugated master oscillator power amplifier (PC MOPA) system.

9 Claims, 1 Drawing Sheet

BIREFRINGENCE-COMPENSATED ALIGNMENT-INSENSITIVE FREQUENCY DOUBLER

BACKGROUND OF THE INVENTION

This invention relates generally to optical frequency multiplying devices and, more particularly, to frequency doubling devices known as Type II doublers. Frequency doubling devices take advantage of optical properties of some types of crystals, specifically a property relating to indices of refraction measured along different axes. The crystals used in doublers are anisotropic, meaning that their optical properties are not the same in all directions. The index of refraction is dependent both on the direction in which the index is measured and on the frequency or wavelength of the light. In a type I crystal, the index along one axis, as measured for a fundamental frequency of operation, matches the index along another axis, as measured for a second harmonic frequency. When a light beam polarized in one plane and at the fundamental frequency is input to the crystal at an appropriate angle, a second-harmonic output beam, polarized in an orthogonal plane, is produced. Typically, the angle of the crystal with respect to the input beam has to be adjusted to tune or phase-match the device to provide a near-exact index match to the second harmonic output beam.

Type II doublers operate on a slightly different principle. An input beam is split by the crystal into two orthogonal components which are, in effect, frequency summed in the crystal to produce a double frequency output beam. Type II doublers are generally preferred because they are more efficient. The Type II crystal may also need to be tilted to tune the device to provide the desired output. An important difference between the two types of doublers is that Type I doublers do not change the polarization of the input beam, but a simple Type II doubler acts as a random waveplate and converts the input beam into an elliptically polarized beam. Moreover, tilting the crystal for any reason, such as to optimize phase matching, will change the ellipticity of the beam polarization.

An important application of doublers is in phase conjugated master oscillator power amplifiers (PC MOPAs), to provide visible light output from such devices. Phase conjugated frequency doubling requires that the doubler be placed within the PC MOPA, and aberrations caused by the doubler are then canceled in a second pass through the doubler, after phase conjugation. Type I doublers have been used in this type of configuration. Type II doublers, however, which inherently introduce some birefringence (as much as 50% for circular polarization), are not ideally suited to PC MOPA applications.

Accordingly, there is a need for a Type II frequency doubler structure that can be used in a PC MOPA or in a laser resonator without disturbing the polarization state of the laser beam. In other words, there is a need for a Type II frequency doubler that is birefringence-compensated. The present invention is directed to this end.

SUMMARY OF THE INVENTION

The present invention resides in a frequency multiplying assembly for increasing the frequency of a laser beam without affecting its polarization state. Briefly, and in general terms, the invention comprises a first frequency multiplier crystal positioned to receive a light beam at a fundamental frequency and to produce an output beam having a harmonic frequency component and a residual fundamental frequency component; a polarization rotator positioned to receive the output beam and to rotate the polarization angle of the residual fundamental frequency component by an odd multiple of 90°; and a second frequency multiplier crystal of the same length as the first, positioned to receive the output beam from the polarization rotator, wherein the first and second frequency multiplier crystals have corresponding crystallographic axes oriented parallel to each other. Random birefringence introduced in the first frequency multiplier crystal is substantially canceled in the second frequency multiplier crystal, and this birefringence compensation capability is relatively insensitive to changes in angular alignment of the assembly.

As disclosed in this specification, the first and second frequency multiplier crystals are Type II frequency doubler crystals. The crystal materials may be of any suitable material, such as potassium di-hydrogen (deuterium) phosphate (KD*P), potassium titanium phosphate (KTP), beta barium borate (BBO) and lithium beta borate (LBO).

The invention may also be defined in terms of a phase conjugated master oscillator power amplifier (PC MOPA) system providing a frequency-doubled output. This apparatus comprises a master oscillator generating a laser beam of high beam quality and relatively low power, at a fundamental frequency; a Type II frequency doubler positioned to receive an input beam from the master oscillator, and including means for minimizing birefringence; an optical amplifier positioned to receive the input beam from the frequency doubler; and a phase conjugation cell positioned to receive the amplified input beam and oriented to generate a reflected beam in phase conjugated form directed back into the amplifier. Substantially all aberrations introduced into the input beam in the frequency doubler and the amplifier will be canceled as the reflected beam passes through the amplifier and the frequency doubler. The return beam is output from the frequency doubler at a second harmonic frequency and with minimal birefringence, and the apparatus further includes means for extracting energy at the second harmonic frequency.

More specifically, in the PC MOPA defined above the Type II frequency doubler includes a first Type II frequency doubler crystal positioned to receive a light beam at the fundamental frequency and to produce an output beam having a second harmonic frequency component and a residual fundamental frequency component; a polarization rotator positioned to receive the output beam and to rotate the polarization angle of the residual fundamental frequency component by an odd multiple of 90°; and a second Type II frequency doubler crystal of the same length as the first, positioned to receive the output beam from the polarization rotator, wherein the first and second Type II frequency doubler crystals have corresponding crystallographic axes oriented parallel to each other.

In terms of a novel method for multiplying the frequency of an input light beam while minimizing birefringence, the invention comprises the steps of passing an input beam at a fundamental frequency through a first frequency multiplier crystal positioned to receive the beam and to produce an output beam having a harmonic frequency component and a residual fundamental frequency component; then passing the output beam through a polarization rotator, to rotate the polarization angle of the residual fundamental frequency component by an odd multiple of 90°; and then passing the output beam through a second frequency multiplier crystal of the same length as the first, positioned to receive the output beam from the polarization rotator, wherein the first and second frequency multiplier crystals have corresponding crystallographic axes oriented parallel to each other. Random birefringence introduced in the first frequency multiplier crystal is substantially canceled in the second frequency multiplier crystal. The method may also include the step of making angular alignment adjustments to the first and second frequency multiplier crystals together, to tune them to provide the desired harmonic frequency output beam. The birefringence compensation provided by the method is relatively insensitive to the adjustments in angular alignment.

The invention may also be defined in terms of a method for producing a second harmonic output beam from a phase conjugated master oscillator power amplifier (PC MOPA) system. This method comprises the steps of generating in a master oscillator a laser beam of high beam quality and relatively low power, at a fundamental frequency; transmitting an input beam from the master oscillator to a Type II frequency doubler; amplifying the input beam emerging from the frequency doubler; reflecting the amplified input beam in phase conjugated form from a phase conjugate cell; canceling substantially all aberrations introduced into the input beam in the frequency doubler and the amplifying step during passage of a reflected beam; generating in the frequency doubler a second harmonic beam and with minimal birefringence; and extracting energy from the PC MOPA at the second harmonic frequency.

More specifically, the step of generating a second harmonic beam with minimal birefringence includes the steps of passing an input beam at a fundamental frequency through a first frequency doubler crystal positioned to receive the beam and to produce an output beam having a second harmonic frequency component and a residual fundamental frequency component; then passing the output beam through a polarization rotator, to rotate the polarization angle of the residual fundamental frequency component by an odd multiple of 90°; and then passing the output beam through a second frequency doubler crystal of the same length as the first, positioned to receive the output beam from the polarization rotator, wherein the first and second frequency doubler crystals have corresponding crystallographic axes oriented parallel to each other.

It will be appreciated from the foregoing that the present invention represents a significant advance in the field of frequency doublers. In particular, the invention provides a Type II frequency doubler that is birefringence-compensated, is relatively insensitive to angular orientation, and can be used to advantage in phase conjugated configurations. Other aspects and advantages of the invention will become apparent from the following more detailed description, taken in conjunction with the accompanying drawings.

DESCRIPTION OF THE PREFERRED EMBODIMENT

Figure 1:
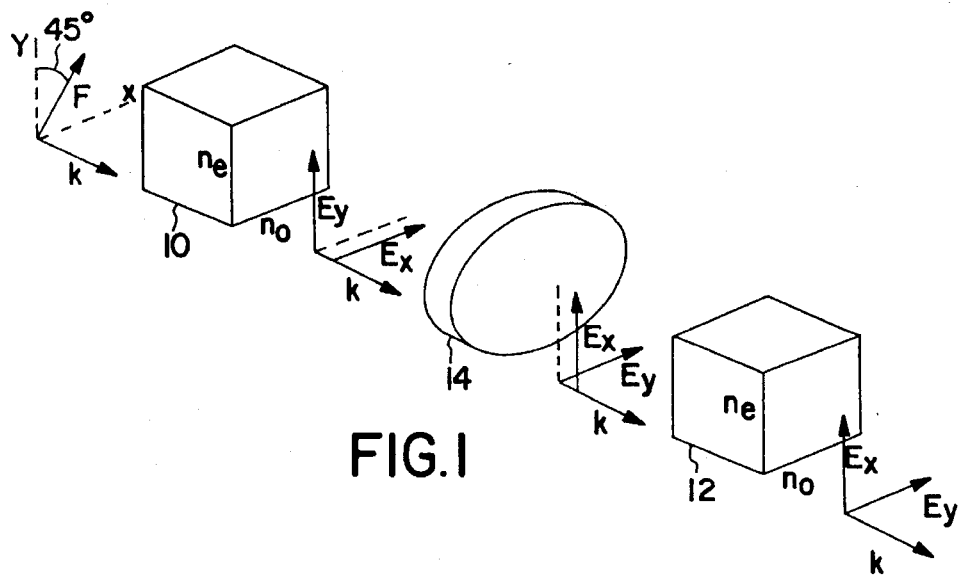
FIG. 1 is a schematic diagram of a birefringence-compensated, alignment-insensitive Type II frequency doubler in accordance with the present invention.

As shown in the drawings for purposes of illustration, the present invention pertains to a frequency doubler for use in laser resonators, master oscillator power amplifiers (MOPAs) and the like. Frequency doubling crystals referred as Type II crystals are preferred because of their high efficiency but have the drawback that they may have high birefringence loss (up to 50%).

Type II crystals split an input beam into two orthogonal components which are, in effect, frequency summed in the crystal to produce a double frequency output beam. Type II doublers are generally preferred because they are more efficient. For purposes of explanation, a doubling crystal may be considered to have different indices refraction, referred to as the ordinary and extraordinary indices $n_o$ and $n_e$, measured along different axes. Birefringence in the crystal is proportional to the difference between these indices and to the length of the crystal, and is inversely proportional to the wavelength of light. However, the indices and the birefringence will change when the crystal is tilted for some reason. In most applications, the doubler crystal must be angularly adjusted to tune the device to provide the desired output. Therefore, the degree of birefringence in the crystal is largely unpredictable.

One possible approach to compensating for birefringence is to employ two crystals in sequence, but with their axes oriented at 90° to each other. In theory, the net birefringence for an orthogonally oriented pair of doubler crystals would be:

$$\Delta\phi = (2\pi/\lambda)[(n_o - n_e) L_1 + (n_e - n_o) L_2]$$
$$= (2\pi/\lambda)(n_o - n_e)(L_1 - L_2),$$

where $L_1$ and $L_2$ are the crystal lengths, $n_o$ and $n_e$ are the ordinary and extraordinary indices, and $\lambda$ is the wavelength of incident light. One can see from this expression that, if the crystal lengths are identical, the net birefringence is zero. The second crystal also effects frequency doubling of any residual energy at the fundamental frequency that emerges from the first crystal. A significant difficulty arises, however, if the pair of crystals has to be tilted for any reason, such as to optimize phase matching in the device. Then the indices will change differently in the two crystals and the net birefringence may no longer be zero.

This difficulty is overcome in the present invention by maintaining the two crystals in angular alignment with each other, but interposing a polarization rotator between them, as shown in FIG. 1. The two type II doubler crystals are indicated by reference numerals 10 and 12 and the polarization rotator is indicated at 14. The rotator 14 provides a 90° (or any odd multiple of 90°) rotation in the polarization angle of residual fundamental-frequency light emerging from one doubler before transmitting the light to the other doubler. This arrangement simulates the action of two orthogonally related doublers by rotating the beam polarization rather than one of the doublers. The relative orientation of the doublers 10 and 12 is kept constant and the net birefringence is maintained at zero even if the pair of doublers is tilted for any reason. The lengths of the crystals can be matched precisely by polishing a larger crystal and slicing it in half.

Figure 2:
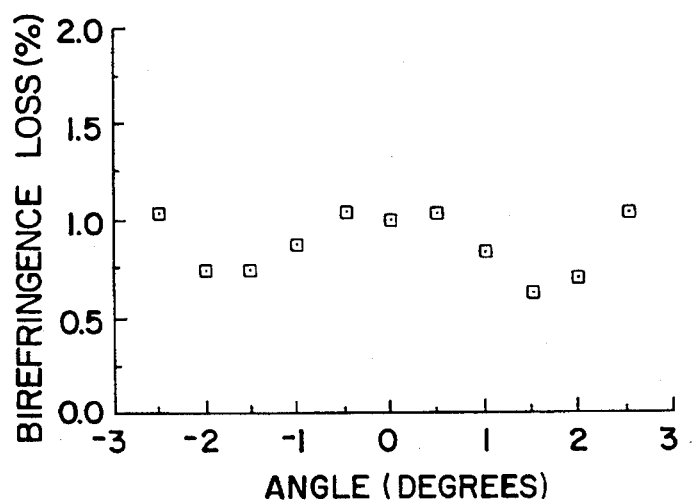
FIG. 2 is a graph plotting residual birefringence as a function of alignment angle, for the device of FIG. 1.

FIG. 2 shows the residual birefringence from a doubler assembly similar to that shown in FIG. 1, using a pair of KD*P (potassium di-hydrogen (deuterium) phosphate) Type II doublers. Other commonly used materials for Type II doubler crystals are potassium titanium phosphate (KTP), beta barium borate (BBO) and lithium beta borate (LBO). It will be observed from the graph of FIG. 2 that the demonstrated net birefringence is less than or equal to approximately 1% over a tuning range of ±2.5°, which is much larger than the range of tuning typically required to optimize a doubler.

Figure 3:
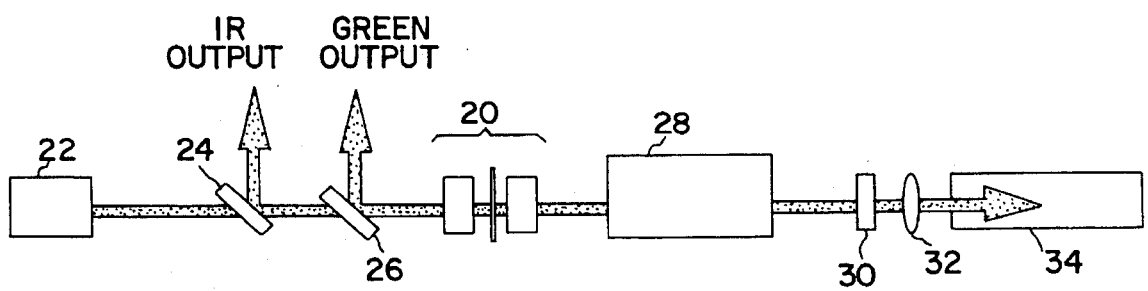
FIG. 3 is a diagram of the optical layout of a phase conjugated master oscillator power amplifier (PC MOPA) employing the doubler of the present invention.

FIG. 3 shows how the doubler assembly of the invention, indicated at 20, can be incorporated into a phase conjugated master oscillator power amplifier (PC MOPA). The other components of the PC MOPA include a master oscillator 22, a polarizer 24, a dichroic mirror 26, an amplifier 28, a quarter-wave plate 30, a lens 32 and a phase conjugating mirror 34 in the form of a stimulated Brillouin scattering (SBS) cell. Aberrations introduced in the doubler 20 and in the amplifier 28 are effectively removed on a second pass through these components, because the beam reflected from the SBS cell 34 is the phase conjugate of the beam that impinges on the cell. The SBS cell has another benefit for the doubler assembly 20. Currently available crystals of materials such as KTP, BBO and LBO are limited to 1–2 cm apertures, which limits the energy of the laser to a few joules unless the doubler is made from segmented crystals. Segmented doubler crystals inherently produce incoherent light, but the incoherence is corrected by the SBS cell in the same way as other aberrations in the doubler and amplifier.

In operation, the master oscillator generates a low energy beam at fundamental frequency, which passes through the polarizer and dichroic mirror, and enters the doubler assembly 20. At this stage the energy of the beam is too small to provide significant frequency doubling, but the beam "reads" or records aberrations in the doubler assembly 20, including any incoherence due to segmenting of the doubler crystals. The beam is amplified, reflected and phase conjugated by the SBS cell 34, and polarization rotated as a result of two passes through the quarter-wave plate 30. The return beam is further amplified and again enters the doubler assembly 20. The energy of the beam is now much higher and efficient frequency doubling can occur. Finally the dichroic mirror 26 operates basically as a frequency filter and extracts the good quality frequency-doubled beam. The polarizer 24 extracts any residual energy at the fundamental frequency.

Without birefringence compensation in the doubler assembly 20, light emerging from the doubler in both passes would contain a random birefringence component. For the first pass of the beam, birefringence would reduce the fidelity of the SBS cell, and would adversely affect the polarization rotation properties of the quarter-wave plate. As a result not all the return energy beam would be outcoupled by the dichroic mirror 26 and the polarizer 24, and a large energy component would be transmitted back into the master oscillator 22, causing probable damage to the master oscillator optics.

It will be appreciated from the foregoing that the present invention represents a significant advance in the field of frequency doublers for use in the generation of visible laser beams of medium to high powers. In particular, the invention provides a simple but highly effective technique for compensating for birefringence in a frequency doubler or multiplier. The resulting doubler assembly is relatively insensitive to angular alignment adjustments and can be used in a phase conjugated configuration without disturbing the polarization state of the beam.

Although one application of the invention has been described in detail, i.e. wherein a frequency doubler is employed in a phase conjugated master oscillator power amplifier, it will be appreciated that the birefringence-compensated doubler of the invention may also be usefully employed in a laser resonator. Commercial applications of the invention include X-ray lithography, laser machining and drilling of composites, space and underwater communication, and underwater detection.

It will also be appreciated that although a specific embodiment of the invention has been illustrated and described, various other modifications may be made without departing from the spirit and scope of the invention. Accordingly, the invention should not be limited except as by the appended claims.

We claim:

1. A birefringence-compensated frequency multiplier assembly, comprising:

a first frequency multiplier crystal positioned to receive a light beam at a fundamental frequency and to produce an output beam containing a harmonic frequency component and a residual fundamental frequency component;

a polarization rotator positioned to receive the output beam and to rotate the polarization angle of the residual fundamental frequency component by an odd multiple of 90°; and a second frequency multiplier crystal of the same length as the first, positioned to receive the output beam from the polarization rotator, wherein the first and second frequency multiplier crystals have corresponding crystallographic axes oriented parallel to each other;

wherein random birefringence introduced in the first frequency multiplier crystal is substantially canceled in the second frequency multiplier crystal, and this birefringence compensation is relatively insensitive to changes in angular alignment of the assembly.

2. An assembly as defined in claim 1, wherein:

the first and second frequency multiplier crystals are Type II frequency doubler crystals.

3. An assembly as defined in claim 2, wherein:

the Type II doubler crystals are of a material selected from the group consisting of potassium di-hydrogen (deuterium) phosphate (KD*P), potassium titanium phosphate (KTP), beta barium borate (BBO) and lithium beta borate (LBO).

4. A phase conjugated master oscillator power amplifier (PC MOPA) system providing a frequency-doubled output, comprising:

a master oscillator generating a laser beam of high beam quality and relatively low power, at a fundamental frequency;

a Type II frequency doubler positioned to receive an input beam from the master oscillator, and including means for minimizing birefringence;

an optical amplifier positioned to receive the input beam from the frequency doubler;

a phase conjugation cell positioned to receive the amplified input beam and oriented to generate a reflected beam in phase conjugated form directed back into the amplifier, wherein substantially all aberrations introduced into the input beam in the frequency doubler and the amplifier will be canceled as the reflected beam passes through the amplifier and the frequency doubler, and the return beam is output from the frequency doubler at a second harmonic frequency and with minimal birefringence; and means for extracting energy at the second harmonic frequency;

wherein the Type II frequency doubler includes
a first Type II frequency doubler crystal positioned to receive a light beam at the fundamental frequency and to produce an output beam having a second harmonic frequency component and a residual fundamental frequency component;

a polarization rotator positioned to receive the output beam and to rotate the polarization angle of the residual fundamental frequency component by an odd multiple of 90°; and a second Type II frequency doubler crystal of the same length as the first, positioned to receive the output beam from the polarization rotator, wherein the first and second Type II frequency doubler crystals have corresponding crystallographic axes oriented parallel to each other;

and wherein random birefringence introduced in the first frequency doubler crystal is substantially canceled in the second frequency doubler crystal, and this birefringence compensation is relatively insensitive to changes in angular alignment of the first and second frequency doubler crystals as a unitary structure.

5. A PC MOPA system as defined in claim 4, wherein:

the means for extracting energy at the second harmonic frequency includes a dichroic mirror designed to reflect light at the second harmonic frequency and to transmit light at the fundamental frequency.

6. A PC MOPA system as defined in claim 5, and further comprising:

a quarter-wave plate located within the PC MOPA to effect a change in polarization angle between the input beam and the reflected beam;

a polarization-sensitive mirror located to receive from the frequency doubler any reflected beam component at the fundamental frequency, wherein the orthogonally polarized reflected beam is extracted from the PC MOPA and little energy is transmitted back into the master oscillator.

7. A method for multiplying the frequency of an input light beam while minimizing birefringence, the method comprising the steps of:

passing an input beam at a fundamental frequency through a first frequency multiplier crystal positioned to receive the beam and to produce an output beam having a harmonic frequency component and a residual fundamental frequency component;

then passing the output beam through a polarization rotator, to rotate the polarization angle of the residual fundamental frequency component by an odd multiple of 90°; and then passing the output beam through a second frequency multiplier crystal of the same length as the first, positioned to receive the output beam from the polarization rotator, wherein the first and second frequency multiplier crystals have corresponding crystallographic axes oriented parallel to each other;

wherein random birefringence introduced in the first frequency multiplier crystal is substantially canceled in the second frequency multiplier crystal.

8. A method as defined in claim 7, and further comprising:

making angular alignment adjustments to the first and second frequency multiplier crystals together, to tune them to provide the desired harmonic frequency output beam;

wherein the birefringence compensation provided by the method is relatively insensitive to the adjustments in angular alignment.

9. A method for producing a second harmonic output beam from a phase conjugated master oscillator power amplifier (PC MOPA) system, the method comprising the steps of:

generating in a master oscillator a laser beam of high beam quality and relatively low power, at a fundamental frequency;

transmitting an input beam from the master oscillator to a Type II frequency doubler;

amplifying the input beam from the frequency doubler;

reflecting the amplified input beam in phase conjugated form from a phase conjugate cell;

canceling substantially all aberrations introduced into the input beam in the frequency doubler and the amplifying step during passage of a reflected beam;

generating in the frequency doubler a second harmonic beam; and extracting energy at the second harmonic frequency;

wherein the step of generating a second harmonic beam includes the steps of passing an input beam at a fundamental frequency through a first frequency doubler crystal positioned to receive the beam and to produce an output beam having a second harmonic frequency component and a residual fundamental frequency component;

then passing the output beam through a polarization rotator, to rotate the polarization angle of the residual fundamental frequency component by an odd multiple of 90°; and then passing the output beam through a second frequency doubler crystal of the same length as the first, positioned to receive the output beam from the polarization rotator, wherein the first and second frequency doubler crystals have corresponding crystallographic axes oriented parallel to each other;

wherein random birefringence introduced in the first frequency doubler crystal is substantially canceled in the second frequency doubler crystal.

* * * * *